July 26, 1927.
A. M. BRENNE
1,637,070
FRICTION SHOCK ABSORBING MECHANISM
Filed Aug. 21, 1925
2 Sheets-Sheet 1
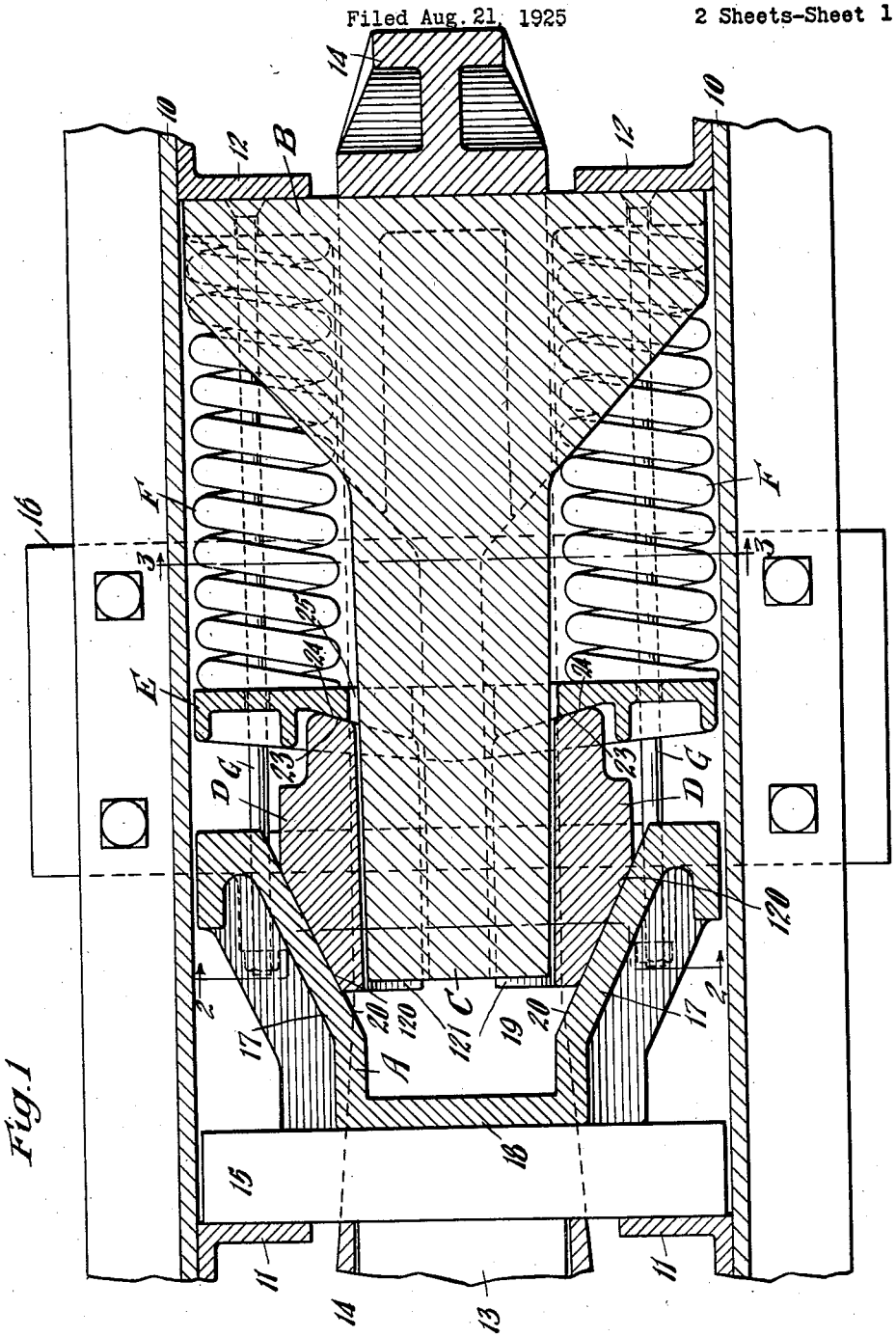

July 26, 1927.
A. M. BRENNE
1,637,070
FRICTION SHOCK ABSORBING MECHANISM
Filed Aug. 21, 1925  2 Sheets-Sheet 2
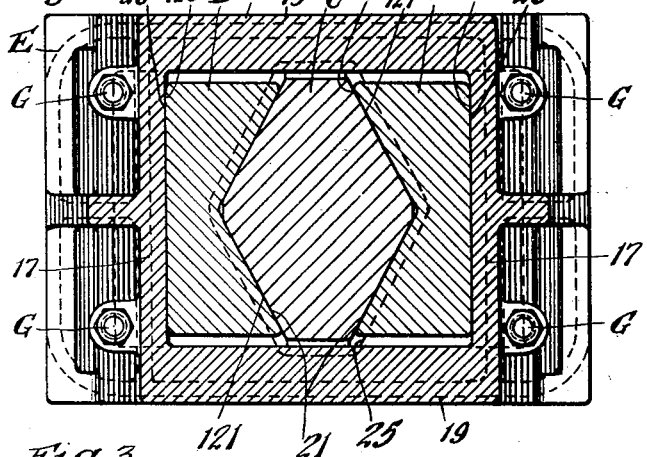
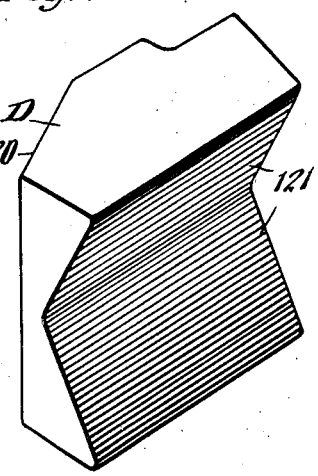
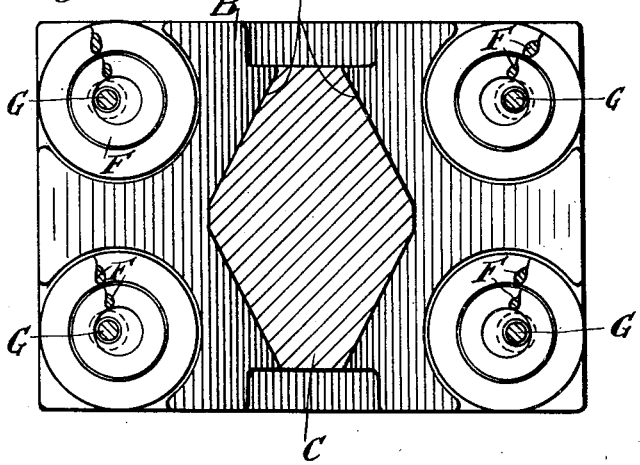
Witness
Wm. Geiger
Inventor
Arild M. Brenne
By George & Haight
His Atty.

Patented July 26, 1927.

1,637,070

UNITED STATES PATENT OFFICE.

ARILD M. BRENNE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 21, 1925. Serial No. 51,607.

This invention relates to improvements in friction shock absorbing mechanisms.

One object of the invention is to provide a friction shock absorbing mechanism especially adapted for railway draft riggings having high capacity and great column strength.

A more specific object of the invention is to provide a mechanism of the character indicated, including a friction post and friction elements co-operating therewith wherein the post is so formed as to provide a column element of great strength to transmit the actuating force when the mechanism is fully compressed.

Other objects and advantages of the invention will more fully and clearly appear from the description and claims hereinafter following.

In the drawings forming a part of this specification, Figure 1 is a horizontal, longitudinal, sectional view of a portion of a railway draft rigging showing my improvements in connection therewith. And Figures 2 and 3 are vertical, transverse, sectional views corresponding respectively to the lines 2—2 and 3—3 of Figure 1. Figure 4 is a detailed, perspective view of one of the friction shoes used in connection with my improved mechanism.

In said drawings, 10—10 indicate channel-shaped center or draft sills of a railway car underframe, to the inner surfaces of which are secured front stop lugs 11—11 and rear stop lugs 12—12 of usual construction. The inner end portion of the drawbar is designated by 13, the same having operatively associated therewith a cast yoke 14 of well-known form, within which is disposed a front follower 15 and the shock absorbing mechanism proper, hereinafter more fully described. The yoke and the parts contained therein are supported in operative position by a detachable saddle plate 16.

The improved shock absorbing mechanism proper, as shown, comprises a front wedge casing A; a rear follower element B; a friction post C; a pair of friction wedge shoes D—D; a spring follower E; two sets of twin arranged main springs F—F; and four retainer bolts G—G.

The wedge casing A is of hollow construction, having rearwardly diverging side walls 17—17, a transverse flat front end wall 18 adapted to bear on the inner surface of the front follower 15. The casing is also provided with spaced, horizontally disposed top and bottom walls 19—19. The rearwardly diverging side walls 17—17 are provided with interior wedge faces 20—20 adapted to cooperate with the corresponding friction shoes.

The rear follower element B is of generally rectangular outline and cooperates with the stop lugs 12. The follower B has the friction post C formed integral therewith. The friction post C is enlarged at the rear end thereof as shown to strengthen the same.

The opposite sides of the post are provided with V-shaped friction surfaces 21, each section of each V-shaped surface presenting a flat face disposed longitudinally of the mechanism and the sections thereof converging laterally outwardly as shown. The friction surfaces 21 converge slightly toward the forward end of the mechanism.

In the normal position of the parts, the front end of the post is spaced from the inner face of the front wall of the follower A a distance equal to the normal compression of the mechanism so that movement of the follower will be arrested by engagement with the post when the mechanism is fully compressed.

The two friction shoes D which are preferably in the form of castings, are of like construction, each having a V-shaped inner friction surface 121 corresponding to the friction surface 21 at the same side of the post and adapted to co-operate therewith. On the outer side, each shoe is provided with a wedge face 120 adapted to co-operate with and correspondingly inclined to one of the wedge faces 20 of the follower A. The inner end of each friction shoe is inclined outwardly as indicated at 23 to co-operate with a similarly inclined surface 24 at the corresponding side of the spring follower E.

The spring follower E is in the form of a heavy, rectangular plate having vertically disposed, reinforcing ribs and horizontally disposed reinforcing flanges. The follower plate is also provided with a central opening 25 adapted to slidingly accommodate the friction post, the opening being of sufficient size to prevent contact with the diverging faces of the post when the mechanism is fully compressed and the follower is in its innermost position.

The two sets of twin arranged springs are interposed between the spring follower E and the rear follower B. Each spring element preferably consists of another relatively heavy coil and a lighter inner coil. The four springs are arranged at the four corners of the mechanism, and the rear ends thereof are seated in suitable recesses formed at the corresponding corners of the rear end of the friction post.

The mechanism is held under initial compression and of overall uniform length by the retainer bolts G, one of the bolts G being disposed at each corner of the mechanism. Each bolt has the head thereof anchored to the rear follower B, the nut of the same being anchored to the follower casing A, suitable openings being provided in the follower casing and spring follower to accommodate the shank of the bolt.

The operation of my improved device is as follows, assuming a compression stroke of the mechanism. As the front follower 15 is forced inwardly, the shoes D will be wedged inwardly against the friction post and carried rearwardly thereof with the follower, compressing the main springs F. This action will continue either until the actuating force is reduced or until the outer end of the post C is engaged by the end wall 18 of the wedge casing A, whereupon the pressure will be transmitted directly through the casing A and post C to the corresponding stop lugs, thereby preventing the springs from being subjected to excessive strain. Upon reduction of the actuating force, the springs F will restore all of the parts to normal position, outward movement of the wedge casing A being limited by the bolts G and outward movement of the shoes D being limited by the wedge faces 20 on the casing A.

In this connection, it is pointed out that the springs F are preferably placed under initial compression when the mechanism is assembled, thus compensating for wear of the various friction and wedge faces.

From the preceding description taken in connection with the drawings, it will be evident that I have provided a gear having friction post of heavy, rugged construction, thereby providing great column strength, without sacrificing the spring capacity of the gear.

While I have herein shown and described the preferred form of carrying out my invention, the same is merely illustrative and I contemplate all changes and modifications that come within the scope of the claims appended hereto.

I claim:

1. In a friction shock absorbing mechanism, the combination with a follower having a longitudinally disposed friction post thereon, said post having friction surfaces on the opposite sides thereof, each surface comprising two longitudinally disposed flat faced sections, said sections converging laterally outwardly; a follower having a pair of opposed interior flat wedge faces, said followers being movable relatively toward and away from each other; friction shoes at each side of the post, each having a friction surface composed of two flat faced sections correspondingly disposed to the flat sections of the surface of the post at the same side of the mechanism and co-operating therewith, and each also having a flat wedge face co-operating with said follower wedge face at the same side of the mechanism; and twin arranged spring resistance means at opposite sides of the post opposing movement of the friction shoes.

2. In a friction shock absorbing mechanism, the combination with front and rear follower elements movable relatively toward and away from each other, one of said followers being provided with a pair of opposed flat interior wedge faces and the other follower having a tapered friction post formed integral therewith, said post having upper and lower friction surfaces on each side thereof, said upper and lower surfaces converging laterally outwardly; a pair of friction shoes disposed on opposite sides of the post, each shoe having upper and lower friction surfaces diverging laterally inwardly and co-operating with the corresponding friction surfaces of the post, and a flat wedge face co-operating with one of said follower wedge faces; and spring resistance elements interposed between the rear follower and the friction shoes.

In witness that I claim the foregoing I have hereunto subscribed my name this 19th day of August 1925.

ARILD M. BRENNE.